US007557862B2

(12) United States Patent
Hundhausen et al.

(10) Patent No.: US 7,557,862 B2
(45) Date of Patent: Jul. 7, 2009

(54) INTEGRATED CIRCUIT BTSC ENCODER

(75) Inventors: Amy Hundhausen, Laguna Beach, CA (US); Hosahalli Srinivas, Irvine, CA (US); Gopal Venkatesan, Aliso Viejo, CA (US); Erik Berg, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1167 days.

(21) Appl. No.: 10/784,863

(22) Filed: Feb. 23, 2004

(65) Prior Publication Data

US 2005/0039218 A1 Feb. 17, 2005

Related U.S. Application Data

(60) Provisional application No. 60/495,509, filed on Aug. 14, 2003.

(51) Int. Cl.
*H04N 7/08* (2006.01)
*H04H 5/00* (2006.01)

(52) U.S. Cl. .......................................... 348/485; 381/3

(58) Field of Classification Search ......... 348/480–485; 725/151, 152; 381/2, 3
See application file for complete search history.

(56) References Cited

U.S. PATENT DOCUMENTS

| | | | | |
|---|---|---|---|---|
| 4,922,537 | A * | 5/1990 | Frederiksen | 704/212 |
| 5,638,112 | A * | 6/1997 | Bestler et al. | 725/151 |
| 5,796,842 | A * | 8/1998 | Hanna | 381/4 |
| 6,122,380 | A | 9/2000 | Pedlow, Jr. | |
| 6,259,482 | B1 * | 7/2001 | Easley et al. | 348/485 |
| 6,567,981 | B1 * | 5/2003 | Jeffrey | 725/80 |
| 6,707,917 | B1 * | 3/2004 | Landgraf et al. | 381/11 |
| 7,146,007 | B1 * | 12/2006 | Maruo et al. | 380/210 |
| 7,277,860 | B2 * | 10/2007 | Srinivas et al. | 704/500 |
| 2003/0131350 | A1 * | 7/2003 | Peiffer et al. | 725/18 |
| 2003/0197810 | A1 * | 10/2003 | Jaffe | 348/726 |
| 2005/0036627 | A1 * | 2/2005 | Venkatesan et al. | 381/2 |
| 2005/0038646 | A1 * | 2/2005 | Berg et al. | 704/205 |
| 2005/0038664 | A1 * | 2/2005 | Srinivas et al. | 704/501 |

OTHER PUBLICATIONS

EP Search Report for EP Application 04017522.6-1224.

* cited by examiner

*Primary Examiner*—Victor R Kostak
(74) *Attorney, Agent, or Firm*—Garlick Harrison & Markison

(57) ABSTRACT

An integrated digital BTSC encoder is implemented on a single CMOS integrated circuit chip with an all digital RF modulator. A set top box is provided that allows for a fully integrated solution which may be used with legacy television systems and also with other audio/visual equipment connected to the set top box.

18 Claims, 8 Drawing Sheets

Integrated all digital RF modulator system

BTSC Encoding RF modulator overall block diagram embodiment of a video processing path

INTEGRATED CIRCUIT BTSC ENCODER

RELATED APPLICATIONS

This patent application claims priority from U.S. Provisional Patent Application Ser. No. 60/495,509, entitled "Integrated Circuit BTSC Encoder" filed on Aug. 14, 2003.

BACKGROUND OF THE INVENTION

1. Field of the Invention

The present invention is directed in general to communication systems. In one aspect, the present invention relates to a method and system for digitally encoding audio signals used in the broadcast of stereophonic audio signals for use in television and cable broadcasting. In a further aspect, the present invention provides an integrated circuit system for modulating an audio signal using digital BTSC stereo encoding techniques.

2. Related Art

Existing television (TV) sets typically can process a variety of input signal types. However, older TV models may only have a Radio Frequency (RF) input. When using a Set Top Box (STB) to create a video source, a method is needed to get the video signal to the TV. The method used is to modulate the baseband signal to a selectable television channel. For example, North American STBs often modulate to the assigned Channel 3 or Channel 4 Radio Frequencies (RFs). The modulation is typically performed using analog techniques, via discrete components. The prior art approach to implementing the interface to a display requiring an RF modulated input signal has typically been to include these discrete components on a board that interfaces to an output port of a device. This has proven to be a highly expensive endeavor as a relatively large amount of cost is associated with the RF input interface.

There are additional drawbacks associated with conventional STB systems. For example, encoded stereo audio signals transmitted to a conventional STB system are typically received and decoded by stereo audio/video (A/V) components connected directly to the program source. Where A/V components are daisy-chained through a coaxial connector with a conventional STB (cable, television or satellite), only the first device to derive left and right audio in the chain receives stereo audio via the coaxial connector, and all remaining devices that have only decoding circuitry connected only by coaxial cable receive monaural sound. Thus, conventional STB systems provide only limited audio signal processing capabilities for distributing decoded audio signal information to television sets associated with the STB.

An example of a conventional system is a STB cable television receiver system for decoding and distributing BTSC stereo encoded audio signals to associated television sets. In such conventional systems, a radio frequency modulator might be included for modulating the decoded audio signal for output from the STB. Such modulators might include some simple signal processing, such as signal preemphasis processing, but prior STB systems have not included on-chip standards-based stereo encoding of the audio signals prior to distribution to associated audio playback devices. In particular, prior STB systems have not included on-chip BTSC encoding of audio signals. As will be appreciated by those skilled in the art, the BTSC encoding standard for encoding stereo signals was adopted by the Federal Communications Commission (FCC). This standard is also referred to as the Multichannel Television Sound (MTS) Transmission and Audio Processing Requirements for the BTSC System—OET-60. This is an example of a standard which permitted television programs to be broadcast and received with bichannel audio, e.g., stereophonic sound. Similar to the definition of stereo for FM radio broadcast, MTS defined a system for enhanced, stereo audio for television broadcast and reception. Also known as BTSC stereo encoding (after the Broadcast Television System Committee (BTSC) that defined it), the BTSC transmission methodology is built around the concept of companding, which means that certain aspects of the incoming signal are compressed during the encoding process. A complementary expansion of the signal is then applied during the decoding process.

The original monophonic television signals carried only a single channel of audio. Due to the configuration of the monophonic television signal and the need to maintain compatibility with existing television sets, the stereophonic information was necessarily located in a higher frequency region of the BTSC signal, making the stereophonic channel much noisier than the monophonic audio channel. This resulted in an inherently higher noise floor for the stereo signal than for the monophonic signal. The BTSC standard overcame this problem by defining an encoding system that provided additional signal processing for the stereophonic audio signal. Prior to broadcast of a BTSC signal by a television station, the audio portion of a television program is encoded in the manner prescribed by the BTSC standard, and upon reception of a BTSC signal, a receiver (e.g., a television set) then decodes the audio portion in a complementary manner. This complementary encoding and decoding ensures that the signal-to-noise ratio of the entire stereo audio signal is maintained at acceptable levels.

FIG. 1 is a block diagram of the front end portion of an analog BTSC encoding system 100, as defined by the BTSC standard. Encoder 100 receives left and right channel audio input signals (indicated in FIG. 1 as "L" and "R", respectively) and generates a conditioned sum signal and an encoded difference signal. It should be appreciated that, while the system of the prior art and that of the present invention is described as useful for encoding the left and right audio signals of a stereophonic signal that is subsequently transmitted as a television signal, the BTSC system also provides means to encode a separate audio signal called SAP (Second Audio Program), e.g., audio information in a different language, which is separated and selected by the end receiver. Further, noise reduction components of the BTSC encoding system can be used for other purposes besides television broadcast, such as for improving audio recordings.

System 100 includes an input section 110, a sum channel processing section 120, and a difference channel processing section 130. Input section 110 receives the left and right channel audio input signals and generates a sum signal (indicated in FIG. 1 as "L+R") and a difference signal (indicated in FIG. 1 as "L−R"). It is well known that for stereophonic signals, the sum signal L+R may be used by itself to provide monophonic audio reproduction and it is this signal that is decoded by existing monophonic audio television sets to reproduce sound. In stereophonic receivers, the sum and difference signals can be added to and subtracted from one another to recover the original two stereophonic signals (L) and (R). Input section 110 includes two signal adders 112, 114. Adder 112 sums the left and right channel audio input signals to generate the sum signal, and adder 114 subtracts the right channel audio input signal from the left channel audio input signal to generate the difference signal.

To accommodate transmission path conditions for television broadcasts, the difference signal is subjected to additional processing than that of the sum signal so that the dynamic range of the difference signal can be substantially preserved as compared to the sum signal. More particularly, the sum channel processing section 120 receives the sum signal and generates the conditioned sum signal. Section 120 includes a 75 μs preemphasis filter 122 and a bandlimiter 124. The sum signal is applied to the input of filter 122 which generates an output signal that is applied to the input of bandlimiter 124. The output signal generated by the latter is then the conditioned sum signal.

The difference channel processing section 130 receives the difference signal and generates the encoded difference signal. Section 130 includes a fixed preemphasis filter 132 (shown implemented as a cascade of two filters 132*a* and 132*b*), a variable gain amplifier 134 preferably in the form of a voltage-controlled amplifier, a variable preemphasis/deemphasis filter (referred to hereinafter as a "variable emphasis filter") 136, an overmodulation protector and bandlimiter 138, a fixed gain amplifier 140, a bandpass filter 142, an RMS level detector 144, a fixed gain amplifier 146, a bandpass filter 148, an RMS level detector 150, and a reciprocal generator 152. The processing of the difference signal ("L−R") by the section 130 is substantially as described in the Background section of U.S. Pat. No. 5,796,842, which explains that the BTSC standard rigorously defines the desired operation of the 75 μs preemphasis filter 122, the fixed preemphasis filter 132, the variable emphasis filter 136, and the bandpass filters 142, 148, in terms of idealized analog filters. Specifically, the BTSC standard provides a transfer function for each of these components, and the transfer functions are described in terms of mathematical representations of idealized analog filters. The BTSC standard further defines the gain settings, Gain A and Gain B, of amplifiers 140 and 146, respectively, and also defines the operation of amplifier 134, RMS level detectors 144, 150, and reciprocal generator 152. The BTSC standard also provides suggested guidelines for the operation of overmodulation protector and bandlimiter 138 and bandlimiter 124. Specifically, bandlimiter 124 and the bandlimiter portion of overmodulation protector and bandlimiter 138 are described as low-pass filters with cutoff frequencies of 15 kHz, and the overmodulation protection portion of overmodulation protector and bandlimiter 138 is described as a threshold device that limits the amplitude of the encoded difference signal to 100% of full modulation where full modulation is the maximum permissible deviation level for modulating the audio subcarrier in a television signal.

In the past, BTSC stereo encoders and decoders were implemented using analog circuits. Through careful calibration to tables and equations described in the BTSC standard, the encoders and decoders could be matched sufficiently to provide acceptable performance. However, conventional analog BTSC encoders (such as described in U.S. Pat. No. 4,539,526) have been replaced by digital encoders because of the many benefits of digital technology. Prior attempts to implement the analog BTSC encoder 100 in digital form have failed to exactly match the performance of analog encoder 100. This difficulty arises from the fact that the BTSC standard defines all the critical components of idealized encoder 100 in terms of analog filter transfer functions, and prior digital encoders have not been able to provide digital filters that exactly match the requirements of the BTSC-specified analog filters. As a result, conventional digital BTSC encoders (such as those described in U.S. Pat. Nos. 5,796,842 and 6,118,879) have deviated from the theoretical ideal specified by the BTSC standard, and have attempted to compensate for this deviation by deliberately introducing a compensating phase or magnitude error in the encoding process.

Given the processing capabilities of current signal processors, digital implementions of a BTSC encoder can result in the opposite problem of too much accuracy when the digital solution is capable of a far higher signal-to-noise ratio than the analog solution. In this case, the digital encoder does not provide satisfactory performance in regions of operation where noise dominates the operation of the two feedback loops. This results in degradation in the performance of the encoding/decoding system and reduced stereo separation for the encoded signal.

In addition to the complexity of the computational requirements for encoding the stereo signals, such as described above, the ever-increasing need for higher speed communications systems imposes additional performance requirements and resulting costs for BTSC encoding systems, such as where digital circuits requiring high speed clock rates are integrated on-chip with other digital circuits requiring different clock rates. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

There is a need to provide a digital encoding system for processing stereophonic audio signals in compliance with an audio encoding standard that provides accurately encoded audio signals. Conventionally known systems have attempted to compensate for magnitude or phase errors created by imprecise digital filtering, or have suffered from degraded performance in low frequency operation where the digital encoder has a higher signal-to-noise ratio than the BTSC-specified analog decoder. Further, the nature of existing analog BTSC encoders has made them inconvenient to use with digital equipment such as digital playback devices. A digital BTSC encoder could accept the digital audio signals directly and could therefore be more easily integrated with other digital equipment. Therefore, there is a need for a better system that is capable of performing the above functions and overcoming these difficulties without increasing circuit area and operational power. Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for digitally encoding stereophonic audio signals in accordance with the BTSC standard. In a selected embodiment, an improved integrated circuit digital RF modulator system is provided with on-chip BTSC encoding functionality to support stereo transmission of audio to associated A/V components that have BTSC decoders. A digital, integrated circuit BTSC encoder and modulator eliminates the need for connecting line-level (RCA-type) audio connectors or an additional board of discrete analog components, to perform the modulation to provide the BTSC encoded RF output signal for use with a display device (television). A fully integrated solution that performs the RF modulation of the BTSC encoded output signal using digital techniques is provided.

In a selected embodiment, a single chip set-top box integrated circuit is provided for encoding and modulating audio/visual signals. In the STB integrated circuit, a digital BTSC encoder encodes first and second digital audio signals (such as Pulse Code Modulation (PCM) baseband audio source signals) using a sum channel processor for digitally processing a digital sum signal and a difference channel processor for digitally processing a digital difference signal. The digital BTSC encoder operates at a sample rate of approximately at least ten times the bandwidth of the signal being encoded (for example, at least approximately 150-200 kHz in an audio encoding application) so that said digital filters in the sum channel processor and the difference channel processor substantially match BTSC analog filter transform functions in both magnitude and phase. The resulting BTSC encoded signal is RF modulated by a digital output modulator to generate a modulated output signal that is provided off chip, for example, as a channel 3/4 RF modulated audio/video signal for a display. In one embodiment, the digital output modulator is implemented as an audio/video processor that radio frequency (RF) modulates an encoded audio/video signal to generate the modulated output signal. In an alternative embodiment, an audio signal is BTSC encoded and then processed by a rate converter and FM modulator to generate a processed audio signal that is combined with the processed video signal output from a video processor in an audio/video processor that combines the processed audio signal and the processed video signal into the audio/video signal. The digital output modulator may also include a Digital to Analog Converter (DAC) for transforming an audio/visual signal into an analog signal, where the DAC is clocked with a high speed clock signal whose timing relationship with the clock for the BTSC encoder is programmably controlled. The STB integrated circuit may be fabricated with CMOS processing technology so that the digital BTSC encoder and a digital output modulator are formed together on a common silicon substrate.

With an alternative embodiment of the present invention, a method for modulating audio/visual signals on a single integrated circuit chip is provided, where audio data and video data is generated, encoded, processed, and modulated on the chip. In synchronization with the digital processing of video data to generate a composite video signal, an audio processor encodes the audio data using a BTSC encoder that operates with a sampling rate of at least of 200 kHz to generate a baseband BTSC composite signal. The baseband BTSC composite signal is rate converted from a first sampling rate to a second sampling rate on the chip, and is then used to frequency modulate an aural carrier using the converted baseband BTSC composite signal on the chip, thereby generating an FM modulated audio signal. By mixing the composite video signal and FM modulated audio signal to a programmable carrier frequency that may be chosen from 0 to 75 MHz, an RF modulated audio/visual signal is generated for output off chip to a display device as a channel 3/4 RF modulated audio/video signal.

The objects, advantages and other novel features of the present invention will be apparent from the following detailed description when read in conjunction with the appended claims and attached drawings.

DETAILED DESCRIPTION

Figure 1:
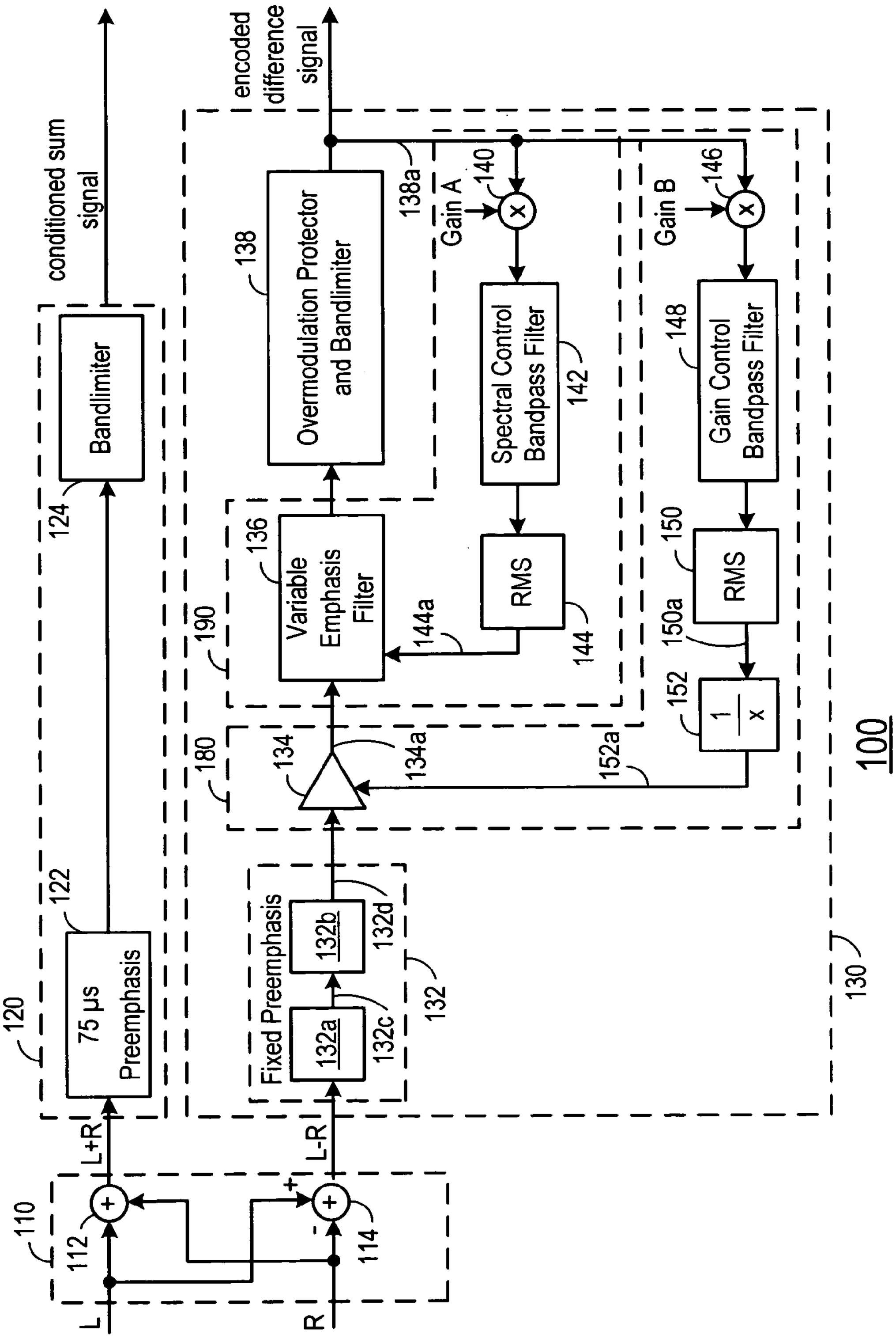
FIG. 1 shows a block diagram of a prior art analog BTSC encoder.
Figure 2:
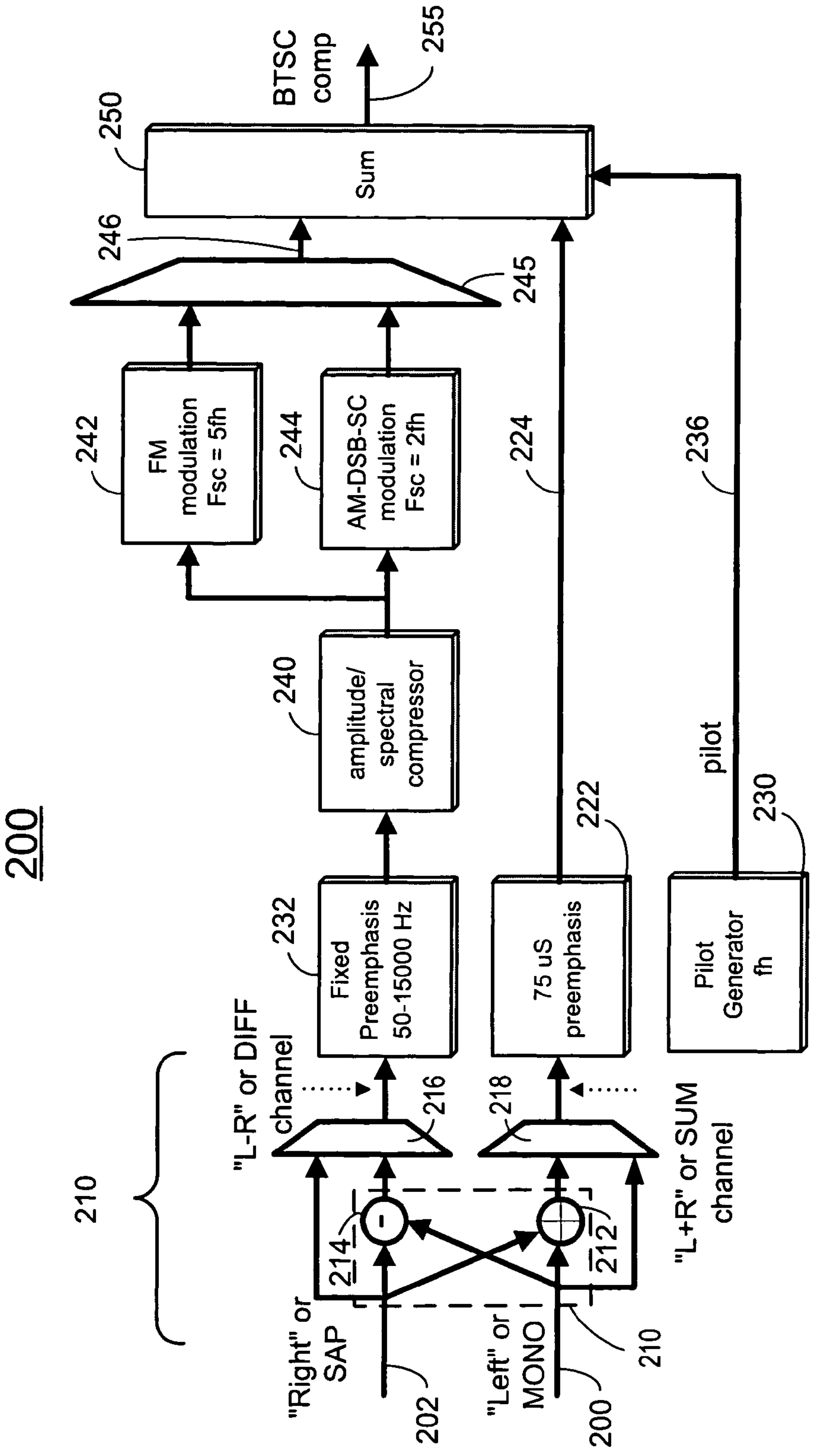
FIG. 2 depicts a system level description of a BTSC encoder.
Figure 7:
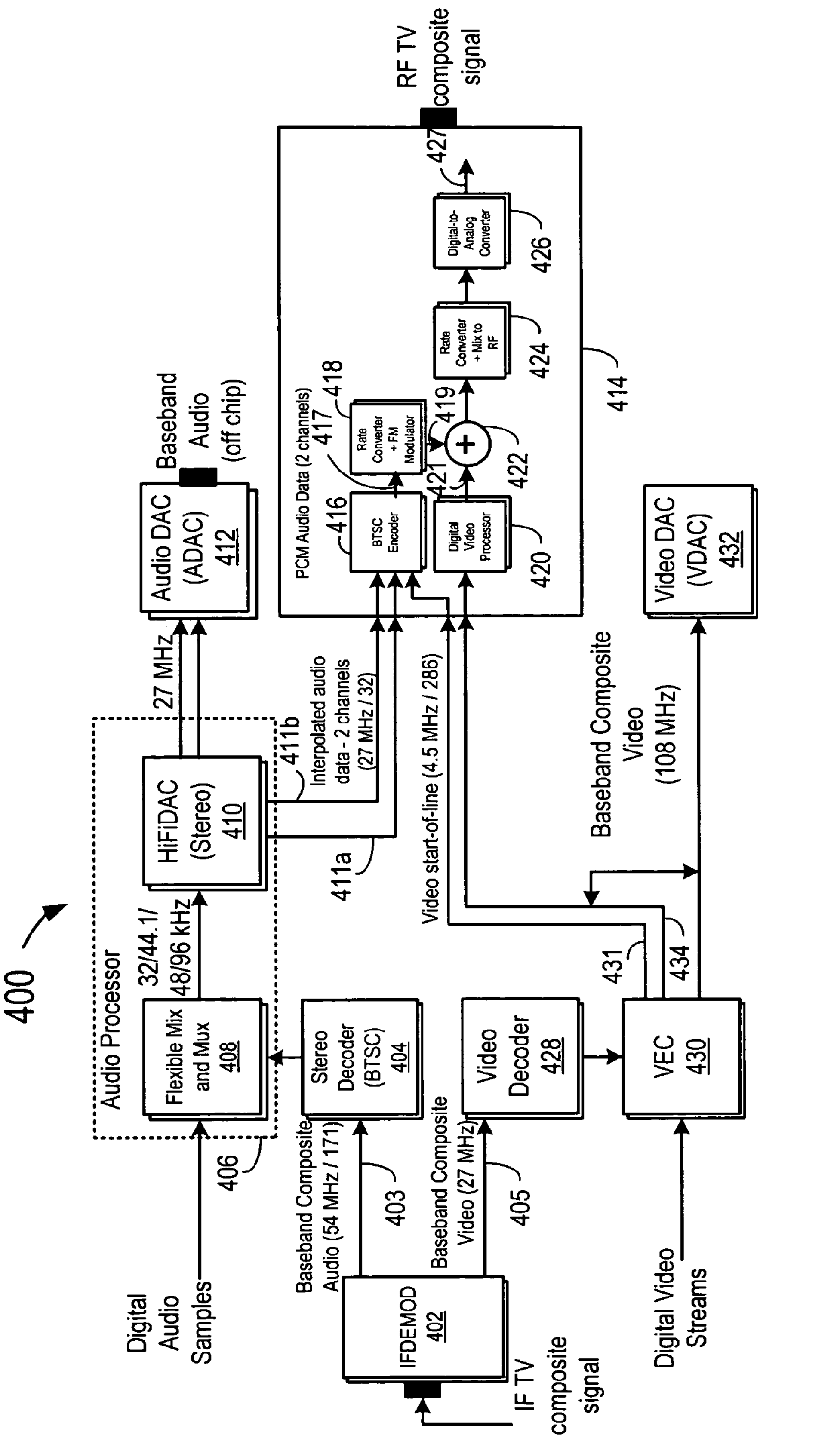
FIG. 7 depicts a diagram illustrating an application of the present invention in the BTSC encoding RFM unit of a set-top box chip.

An apparatus and method in accordance with the present invention provide a system for digitally encoding stereo signals in accordance with the BTSC standard. A system level description of the operation of an embodiment of the BTSC encoder of the present invention is shown in FIG. 2 which depicts a diagram of a digital BTSC encoder 200. As depicted in FIG. 2, the output of encoder 200 is a BTSC compliant signal which includes stereo and SAP functionality for stereo encoding, advantageously sharing an amplitude/spectral compressor circuit 240 to thereby reduce the circuit size. It will be appreciated that the encoder of the present invention may also be implemented to provide the professional channel encoding specified by the BTSC standard, or may otherwise output a baseband BTSC multiplex signal at output 255. As will be appreciated, the BTSC encoder of the present invention has many potential applications. For example, the BTSC encoder may be included as part of an RF modulator core (RFM) in a television set-top box device that converts a NTSC/PAL/SECAM compliant digital composite video source and a pulse code modulated (PCM) audio source into an analog composite television signal that is suitable for demodulation by a television demodulator. A block diagram of an example is shown in FIG. 7 (discussed below), which depicts an application of the present invention in the RFM unit of a set-top box chip. In this application, the baseband BTSC composite signal 255 is fed to a rate converter and FM modulator that modulates the aural carrier, and the resulting signal is then summed with a baseband composite video signal. The combined audio/video signal is mixed to a RF frequency, converted to analog form and sent off chip.

In connection with the system level description of FIG. 2, when monophonic (MONO) audio processing is desired, the Left and Right channels of the input stereo audio signal 200, 202 are summed (in summer 212) and passed to a 75 μsecond preemphasis filter 222. This datapath is considered to be the SUM channel. The 75 μsecond preemphasis filter 222 provides extra gain to the high-frequency components. The output of the preemphasis filter 222 is passed directly to the summing device 250. The other two inputs to the final summation 250 in the BTSC encoder 200, which are the DIFF channel output 246 and the pilot tone 236, are zeroed out. Note that the SUM channel is sometimes referred to as the L+R channel, and the DIFF channel is sometimes referred to as the L−R channel.

When SAP (secondary audio program) processing is desired in the encoder of FIG. 2, the monophonic SAP signal replaces the "Right" audio input channel. The BTSC encoder first sharply bandlimits the SAP audio input stream to 10 kHz using a low-pass filter (not shown). The resulting signal is passed through the DIFF channel to a fixed preemphasis filter 232 whose characteristics are defined in the MTS OET-60. The output of this filter 232 is passed to amplitude/spectral compressor module 240. At modulator 242, the output of the amplitude/spectral compressor module 240 FM modulates the carrier sine wave whose frequency is five times the pilot rate of 15.734 kHz.

When dual monophonic (DUAL MONO) operation is desired, a monophonic audio signal replaces the "Left" audio input channel, and the SAP signal replaces the "Right" audio input channel. Thus, the main monophonic signal is transmitted through the SUM channel at the same time that the SAP signal is transmitted through the DIFF channel. Multiplexer 245 is configured so that the SAP channel passes through the FM modulator 242. Note that in this case, the left audio input 200 and the right SAP input 202 bypass the adder 212 and subtractor 214 and pass through the multiplexers 216 and 218 to the SUM channel and DIFF channel.

Stereo processing is very similar to dual monophonic processing. In the encoder of FIG. 2, an input section 210 receives the left and right channel audio input signals and generates therefrom a sum signal and a difference signal. A signal addition device 212 produces the SUM (L+R) channel based on the sum of the Left and Right channels of the input stereo audio signal. A signal subtraction device 214 produces the DIFF (L−R) channel based on the difference between the Left and Right channels of the input stereo audio signal. It will be appreciated that a matrix functionality may be used to receive the digital left and digital right signals and to generate the digital sum signal and digital difference signal. The SUM channel is passed through the 75 μsecond preemphasis filter 222, and the DIFF channel is passed through the fixed preemphasis filter 232 and the amplitude/spectral compressor module 240. The output of amplitude/spectral compressor 240 is passed to the DSB SC (Double Side Band Suppressed Carrier) AM (Amplitude Modulator) block 244, where it amplitude modulates the sine wave carrier whose frequency (31,468 Hz) is equal to twice that of the pilot tone (15,734 Hz). The output 246 of this modulator along with 224 and 236 is passed to the sum block 250 that produces the BTSC composite signal 255. The output of encoder 200 is a BTSC composite signal 255 that is used to FM modulate the aural carrier.

Figure 3:
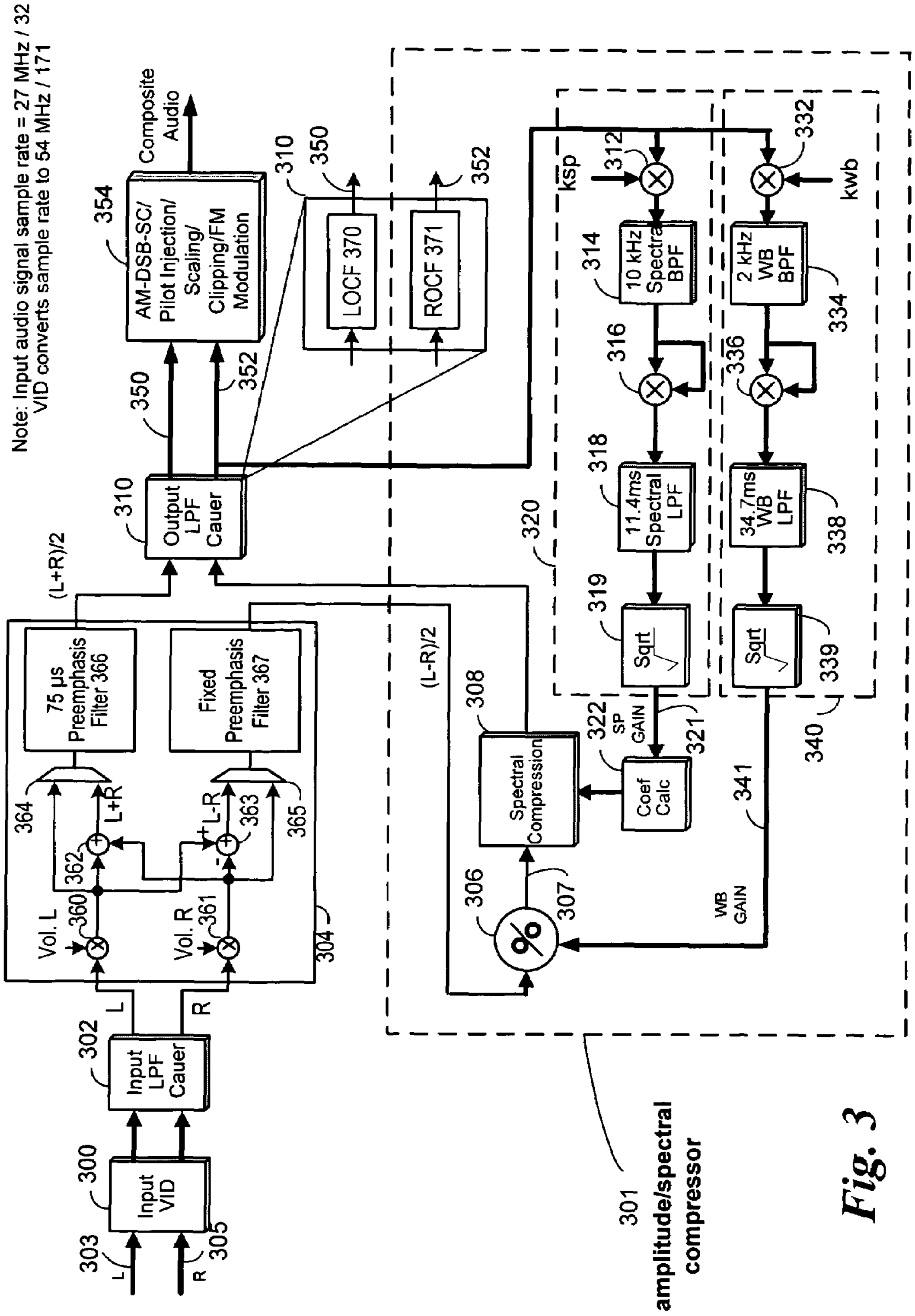
FIG. 3 depicts a block diagram of an alternate embodiment showing additional details of a BTSC encoder in accordance with the present invention.

FIG. 3 depicts a block diagram of an alternate embodiment showing additional details of an amplitude and spectral compressor. The difference channel processor consists of the fixed preemphasis filter 367, the compressor 301, and the right output filter 371 (e.g., a low pass Cauer filter). The compressor 301 is composed of the wideband gain loop and the spectral gain loop. The wideband gain loop is a loop formed by the following components: 306, 308, 371, and 340. The spectral gain loop is a loop formed by the components 308, 371, 320, and 322. The wideband RMS detectors 340 and the spectral RMS detectors 320 monitor the compressor output 352 and produce the wideband gain (WB GAIN 341) and the spectral gain (SP GAIN 321), respectively. The wideband gain is used to control the wideband amplifier 306, which is essentially a divider. Using a clamp or saturator in the WB gain path (e.g., in block 339), the feedback input 341 to the divider 306 is saturated to a minimum value (depending upon the sign of the input) if the wideband gain reaches a minimum threshold value. A similar clamping technique may be used in the spectral gain loop to control the spectral gain value (SP GAIN 321) that is used to compute the coefficients of the spectral compressor 308 using the coefficient calculator 322, on-the-fly. Three divide operations are required to calculate the coefficients and these are also performed on-the-fly in the coefficient calculator 322.

Another way of viewing the difference channel processor shown in FIG. 3 is that the amplitude/spectral compressor module 301 is essentially a wideband gain stage 306 that is followed by a variable preemphasis filter, or spectral compressor, 308. The wideband gain stage 306 is controlled by the WB GAIN signal 341 through the wideband gain loop or feedback path. The spectral compressor 308 is controlled by the SP GAIN signal 321 through the spectral gain loop or feedback path. As depicted, the feedback paths of the BTSC encoder begin at the output 352 of the right low-pass Cauer filter ROCF 371. These feedback paths are used to control the wideband divider 306 and spectral compressor 308. The spectral feedback path control signal is based on the RMS power that passes through a bandpass filter 314 with a 10 kHz center frequency. The wideband feedback path control signal is based on the RMS power that passes through a bandpass filter 334 with a 2 kHz center frequency. When the input signal to the BTSC encoder is a low frequency signal, the feedback paths are dominated by noise because the signal lies outside the passband of the bandpass filters 314, 334.

As indicated in FIG. 3, the BTSC encoder receives two audio channel inputs (L 303 and R 305). To allow proper digital processing of the signals, the encoder should operate at a sufficiently high rate (for example, 10-20 times the audio bandwidth) to allow the analog and digital filters to match in phase and amplitude. The choice of the sampling rate is driven by the need for the digital filter implementations to more closely match the analog filter transform functions (specified by the BTSC standard) in both magnitude and phase. A sample rate of 316 kHz results in good matching of the magnitude and phase responses between the analog and digital domains so that no phase compensation is needed in the encoding process. In a selected embodiment, two channel inputs 303, 305 which arrive at a first sample rate (e.g., 27 Mhz/32) are converted to a second sample rate (e.g., 54 MHz/171) by the input VIDs (Variable Rate Interpolator Decimator) 300.

The input streams to the encoder are filtered by low-pass Cauer filters 302 to limit the bandwidth of signals for system compliance. For MONO mode of operation (with stereo and SAP turned off), the two audio inputs may be programmably limited to 15-20 kHz or to other frequencies. For STEREO mode of operation, the two audio inputs are limited to 15 kHz. For MONO/SAP mode of operation, the input 303 for audio channel 1 is limited to 15 kHz while the input 305 for audio channel 2 is limited to 10 kHz. This low-pass filtering operation is achieved by reprogramming the coefficients to the input low-pass Cauer filters 302 for each mode of operation. By designing the input low-pass Cauer filters 302 to have sharp transition bands, emphasis of noise outside of the audio bands is prevented during the encoding operation. By providing input filters with stop-band attenuation of −70 dB, good rejection of the input out-of-band noise after the preemphasis is provided.

In the encoding system, output low-pass Cauer filters 370 and 371 reduce the high-frequency out-of-band noise that is amplified by the filters 366, 367, 306 and 308. The resulting filtered digital sum signal 350 and filtered digital difference signal 352 may be processed, programmably scaled and clipped in the modulator block 354. Modulator 354 is used to inject the pilot subcarrier that is frequency locked to the horizontal scanning frequency of the transmitted video signal, as required by the MTS OET-60 standard. In addition, AM-DSB-SC or FM modulation may be implemented in modulator 354 for modulating the digital difference signal 352.

Figure 4:
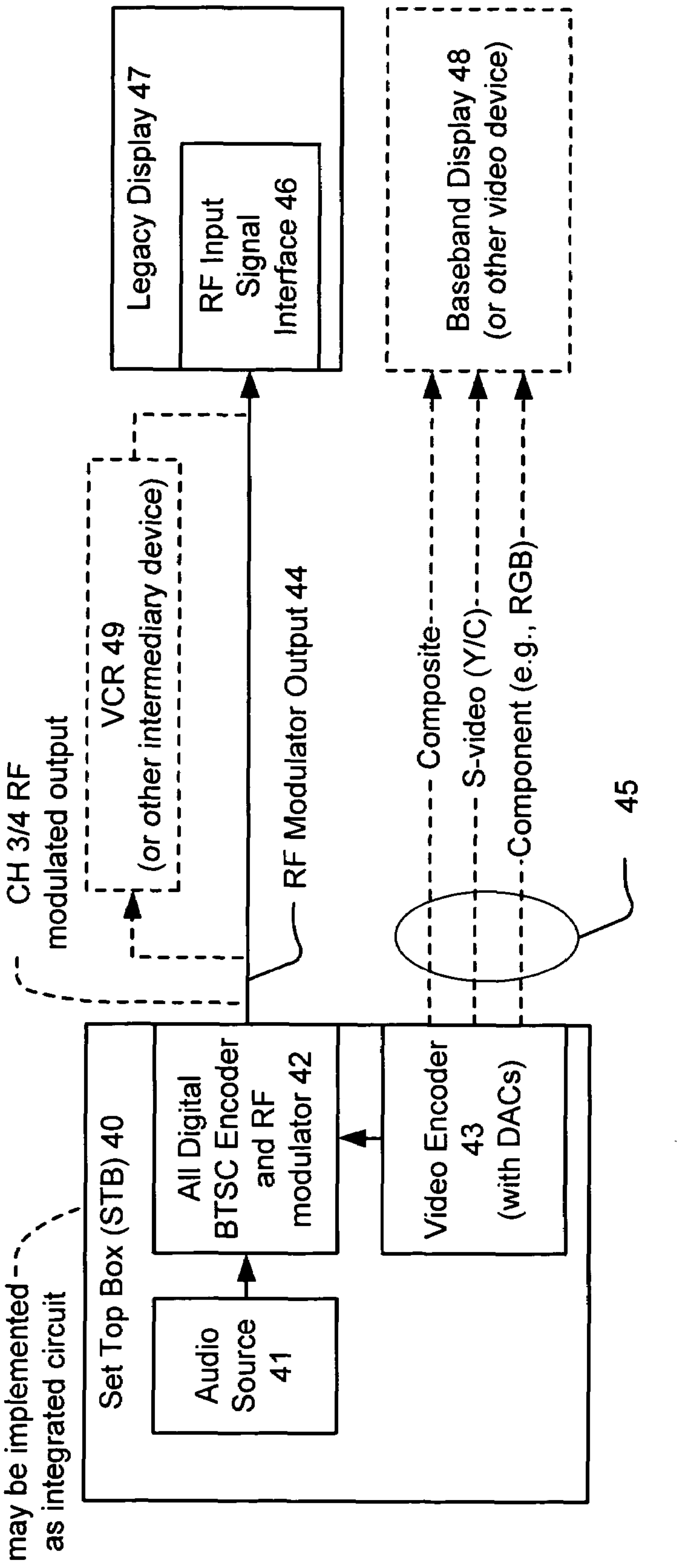
FIG. 4 is a system diagram illustrating an embodiment of an integrated all digital BTSC encoding RF modulator system built in accordance with the present invention.

As referenced above, the BTSC encoder of the present invention may be included in a variety of applications, such as the RF Modulator core 42 shown in FIG. 4, which illustrates an embodiment of an integrated all digital BTSC encoding RF modulator system built in accordance with the present invention. A Set Top Box (STB) 40 interfaces with audio/video devices, such as legacy television display 47 or a baseband digital display 48. A single integrated circuit 40 supports the functionality of the STB, including the functionality of the invention of including an integrated, all digital RF modulator and BTSC encoder 42.

The legacy display 47 requires the use of a Radio Frequency (RF) input signal 44 (that may be referred to as an RF modulator output signal from the perspective of the STB 40). This RF modulated output signal 44 may be implemented as being a channel 3/4 (or such) RF modulated audio/video signal in some embodiments for compatibility with the assigned Channel 3 or Channel 4 Radio Frequencies (RFs). While the receiver module 47 is typically a display device, the receiver module may also include non-display audio/video (A/V) devices that are able to receive the RF modulator output signal, such as a Video Cassette Recorder (VCR) 49 or some other type of intermediary device.

The STB 40 includes an all digital RF modulator 42 that is able to generate the RF modulator output signal that is required as an input to the legacy display. The RF modulator 42 can also generate RF-modulated input signals onto television channels other than channels 2-4. In addition, an unmodulated baseband BTSC composite signal may be directly passed to output. The all digital RF modulator 42 may be viewed as being an integrated circuit Digital Signal Processor (DSP) functional block which includes a BTSC encoding functionality. The legacy display 47 includes a RF input signal interface 46 that is able to receive the RF modulator output signal 44 from the all digital RF modulator 42 of the STB 40. The input signal interface 46 may also include a BTSC decoder functionality for decoding BTSC encoded signals. The legacy display 47 may be viewed as being an older television (TV) model, or any other display, that may receive an RF input. In a display device that includes functionality for both baseband inputs as well as RF-modulated inputs, there may be times when the RF input may be preferred. Either of the outputs from the STB 40 may be selected. The present invention shows, for the first time, a fully integrated BTSC encoder and RF modulator 42 that may be implemented in CMOS (Complementary Metal Oxide Semiconductor), as part of a single chip STB 40. In other words, an integrated circuit that includes the STB functionality may be fabricated using CMOS (Complementary Metal Oxide Semiconductor) processing.

The present invention allows for backward compatibility with the number of legacy displays that are still in use today. A video encoder 43 and an audio source 41 are operable to provide digital signals to the all digital RF modulator 42 within the STB 40, so that the all digital RF modulator 42 may generate the appropriate encoded RF modulator output signal for use with the audio/video devices.

In accordance with the present invention, the STB 40 also includes the ability to provide composite, S-video, and/or component video (for example, red/green/blue or RGB) outputs 45 for use within a baseband display 48. The video encoder 43 (with its Digital to Analog Converters (DACs)) produces a signal that may be in one of these formats for output to the baseband display 48. The baseband display 48 may include a number of devices such as a High Definition Television (HDTV), a computer, or other display that may accept as input a signal in one or more formats. Composite video, S-video, and/or component video are illustrative of some of the many types of signals that may be provided by the STB 40 to the baseband display 48. It is also noted that the display 48, if equipped with a RF modulated analog input port, would also be capable of receiving the RF modulator output 44 as well.

Figure 5:
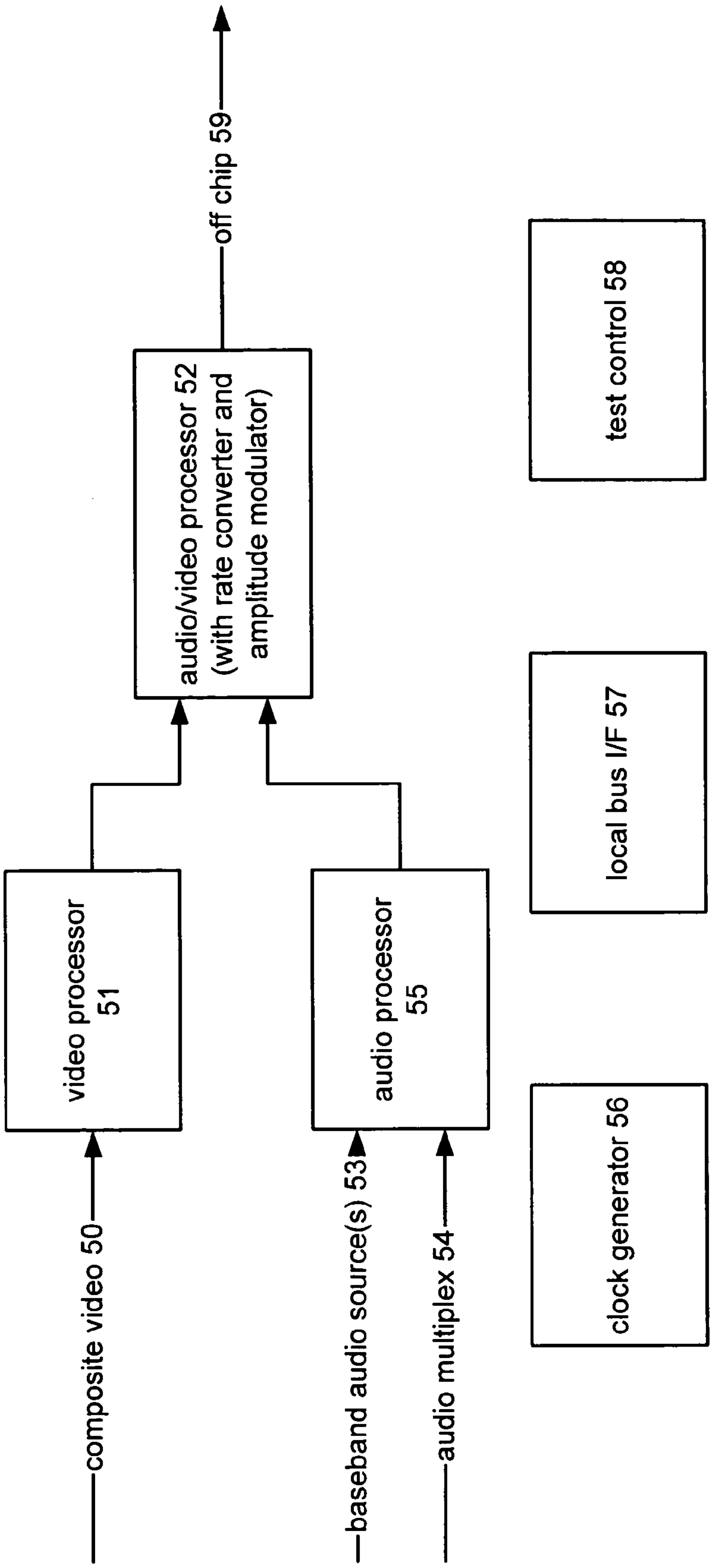
FIG. 5 is an overall block diagram illustrating an embodiment of a BTSC encoding RF modulator built in accordance with the present invention.

Persons skilled in the art will appreciate that an RF modulator is not a rigidly defined concept, and can be understood to refer to a specific rate conversion, amplitude modulation and/or frequency modulation functions, or more broadly to a signal processing, conditioning and/or encoding function in combination with a sampling rate conversion, amplitude modulation and/or frequency modulation. For example and as illustrated in FIG. 5, an embodiment of an RF modulator built in accordance with the present invention includes a video processor 51, audio processor 55 and audio/video processor 52, and the collection of these blocks provides BTSC encoding, rate conversion, amplitude modulation and frequency modulation. Video processor 51 receives the composite video signal 50 and, after video processing, provides an output to an audio/video processor 52. Audio processor 55 receives audio signals 53, 54 and, after audio processing, provides an output to the audio/video processor 52. The audio/video processor 52 provides an off chip signal 59. The RF modulator also includes a clock generator 56, a local bus interface 57 and a test control portion 58 that supports additional corresponding functionality.

As illustrated in FIG. 5, the RF modulator receives a composite video input signal 50 and one or more baseband audio source input signals 53 (such as PCM (Pulse Code Modulation) audio data) and/or an audio "multiplex" signal 54 (such as BTSC (Broadcast Television Systems Committee) audio data). In the RF modulator, the baseband video signal 50 is first filtered to pre-compensate for the group delay distortion in the receiver. Then, the video is filtered to remove any signal components in the audio carrier frequency band. The signal is then scaled and shifted to meet the depth of modulation requirements. In the audio/video processor 52, the frequency modulated (FM) audio signal is added to the video signal. The sum (audio+video) signal is then sample rate converted to a high frequency sample rate. The signal is then modulated to the desired RF frequency.

Figure 6:
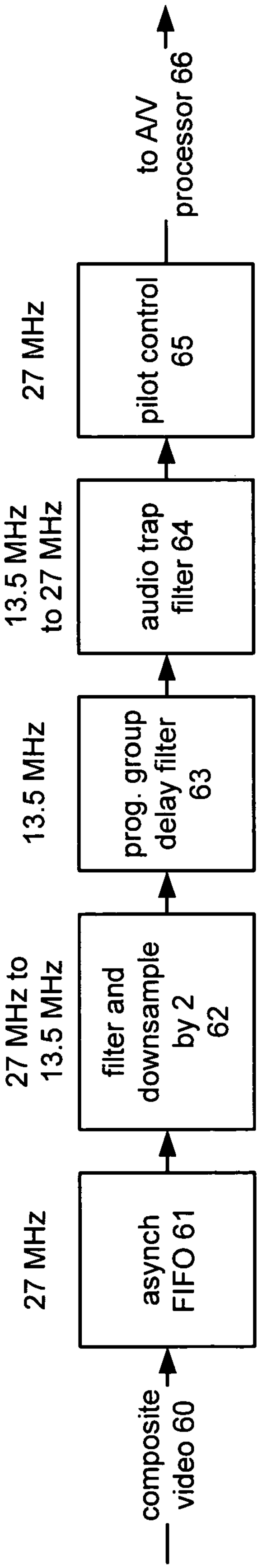
FIG. 6 depicts an embodiment of a video processing path that is employed according to the present invention.

FIG. 6 illustrates additional details of the video processing path in accordance with the present invention. As depicted, composite video signal 60 is provided to an asynchronous FIFO (First In/First Out) device 61 that operates at 27 MHz. Then, the output signal of the asynchronous FIFO 61 is decimated by a factor of 2 in downsampling filter 62 which reduces the sampling rate from 27 MHz to 13.5 MHz. Then, a programmable group delay digital filter 63 compensates the decimated output signal for the specific group delay requirements. An audio trap digital filter 64 attenuates video components in the audio carrier frequency band, and is operable to attenuate video signals in a frequency range of an audio signal that contains an audio FM (Frequency Modulated) carrier. This audio signal may be either one or both of a baseband audio signal and/or an audio multiplex signal that FM modulates the audio carrier. A pilot control block 65 provides an output signal 66 to an A/V (Audio/Video) processor. For example, the video processing path may be viewed as being performed within the video processor 51 to provide an output signal 66 to an A/V processor 52, as shown in FIG. 5.

The preceding and following figures described herein provide illustrative examples of the various frequencies at which a device operating in accordance with the invention may operate. It will be understood that the particular values shown herein may be altered without departing from the scope and spirit of the invention; these particular values are exemplary of just some of the possible embodiments in which the invention may be implemented.

As referenced above, the BTSC encoder of the present invention may be included in a variety of applications, such as the RF Modulator core (RFM 414) depicted in FIG. 7 for generating the RF TV composite signal that is used by a set-top box to generate channel 3/4 output signal(s) 427. In the depicted embodiment, RFM 414 converts a NTSC/PAL/SECAM compliant digital composite video source 434 and a pulse code modulated (PCM) audio source 411*a*, 411*b* into an analog composite television signal 427 that is suitable for demodulation by a television demodulator. Moreover, the RFM 414 may stereo encode the audio source according to the BTSC standard. In a single chip integrated circuit embodiment of the present invention, a digital BTSC encoder 416 is disclosed for encoding stereo audio signals 411, where the encoder 416 is integrated as part of a single chip set-top box 400 fabricated with CMOS technology. Upon integration into a set-top box chip 400, the present invention reduces board level components, thereby reducing costs and improving performance over prior art approaches. Thus, the present invention shows, for the first time, a fully integrated digital BTSC encoder 416 that may be implemented in CMOS as part of a single chip set- top box 400.

Figure 8:
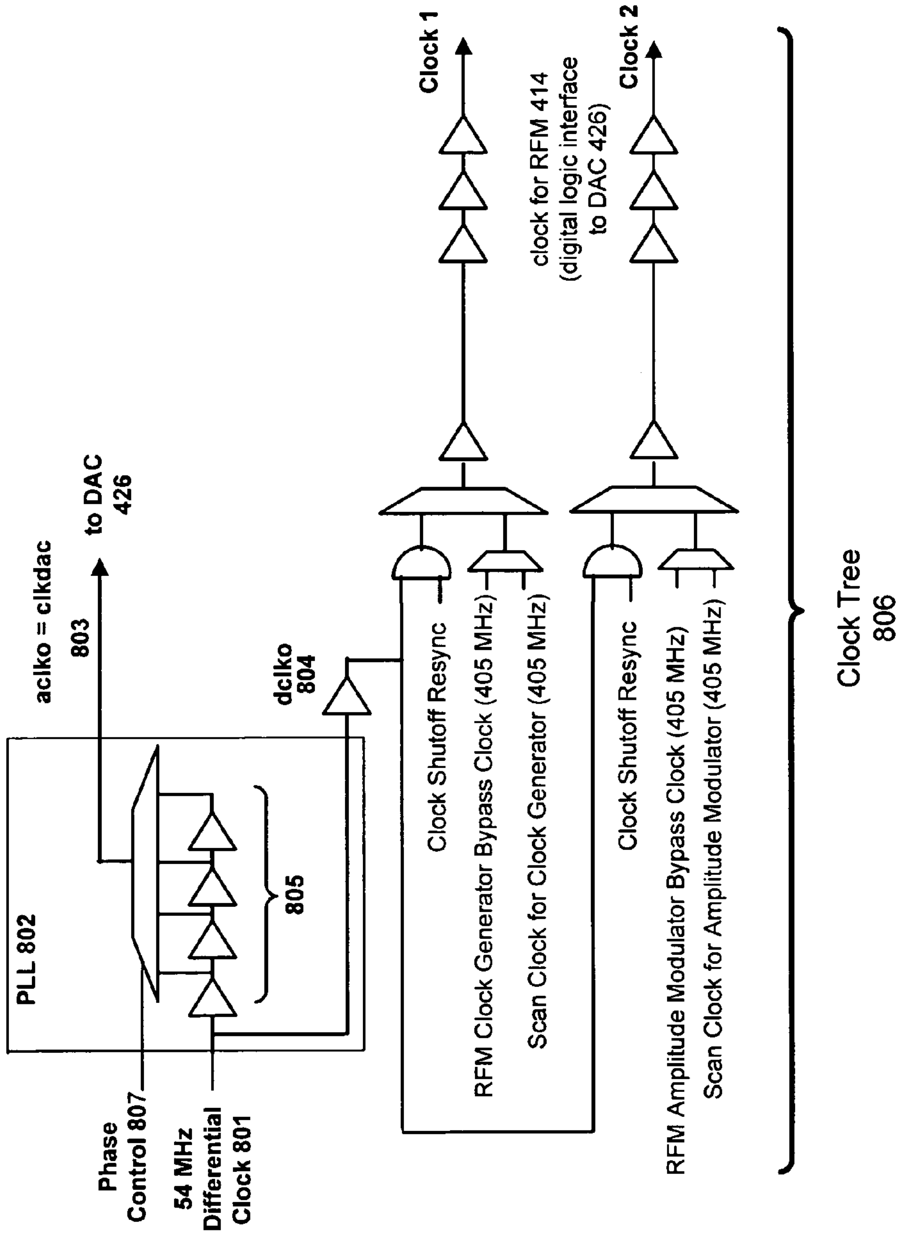
FIG. 8 depicts a portion of an RFM clock generator.

The block diagram in FIG. 7 shows the various operations to be performed in the RFM 414, as well as the primary datapath input and output signals. As depicted in the context of a set-top box chip shown in FIG. 7, the RFM 414 can be considered to be a part of the audio/video back end. A simplified drawing of part of a set-top box is depicted in FIG. 7 with a focus on the operations performed for an analog television channel. For additional contextual understanding of how the present invention may be implemented in various illustrative set top box embodiments, see the description of FIGS. 6, 7 and 8 provided in co-pending U.S. patent application Ser. No. 10/372,427, entitled "All Digital Radio Frequency Modulator," filed Feb. 21, 2003, and assigned to Broadcom Corporation, which is hereby incorporated by reference in its entirety. In accordance with the present invention, the BTSC encoding functionality may be implemented as an integral part of the RF modulator block described in the foregoing application.

In a further application of the present invention, a dual high-definition (HD) digital video system-on-a-chip includes BTSC encoding circuitry, RF modulation circuitry and dual digital audio processors for processing multiple audio/video programs. The system-on-a-chip may include an IF demodulator, an NTSC/PAL video decoder, a transport processor, dual digital audio processors, dual high-definition (HD) MPEG video decoders, 2D and 3D graphics processing, digital processing of analog video and audio, an analog video digitizer and DAC functions (six DACs), stereo high-fidelity audio DACs, a MIPS R5000 class processor, and a peripheral control unit providing a variety of set-top box control functions.

In a selected embodiment depicted in FIG. 7, the set-top box chip may contain blocks that perform the inverse functions to the RFM. Thus, an IF demodulator ("IFDEMOD") block 402 demodulates an analog composite IF television signal and produces a digital baseband composite video signal 405 and a digital baseband audio signal 403 (either monophonic or BTSC baseband multiplex). By exchanging data between the RFM 414 and IFDEMOD 402, both can be co-verified on the system bench using an all-digital interface. This exchange of data is referred to as a "loopback mode" and may be used for test functions. The purpose of the loopback mode from the IFDEMOD 410 to the RFM 414 is to allow the audio and video data that is associated with an analog television channel to "pass through" the chip without requiring any encoding or decoding.

The primary audio source for the RFM 414 is the stereo high fidelity audio DAC 410 (HiFiDAC) that is part of the audio processor 406. As shown, BTSC decoder 404 receives the baseband composite audio signal 403 and generates a decoded audio signal for the audio processor 406. HiFiDAC 410 provides two channels (411*a*, 411*b*) of pulse code modulated (PCM) audio data to the RFM 414. The primary video source for the RFM 414 is the video encoder 430 (VEC) which receives digital video stream data from the video decoder 428. VEC 430 provides the NTSC, PAL, or SECAM encoded digital baseband composite video signal 434 that accompanies the HiFiDAC's audio signal. VEC 430 also provides a video start-of-line signal 431 that allows the RFM to lock its audio subcarriers to the video line rate. In accordance with the present invention, one or more VECs are provided, depending on how many output channels are supported by the STB.

In terms of the audio/video backend functionality of the set-top box chip 400, the RFM 414 includes a digital audio processor portion (416, 418), a digital video processor portion (420) and a digital audio/video processor portion (422, 424, 426). The digital audio processor portion includes the BTSC encoder 416 and rate converter with FM modulator 418. The RFM 414 accepts four input signals, including three input signals for the BTSC encoder 416 which are expected to be employed in normal operation and a baseband composite video input signal 434. The first two BTSC encoder input signals are two channels of audio PCM data 411*a*, 411*b*. The third BTSC encoder input signal is the video start-of-line signal 431, which is used to synchronize the pilot tone needed for BTSC encoding to the video line rate. The BTSC encoded audio is combined with the video data at adder 422 at the digital audio/video processor and then rate converted, mixed to RF (424) and converted from digital to analog format (426) to generate the RF TV composite output signal 427. In a selected embodiment, the digital video 421 and FM modulated audio 419 signals are converted and mixed at block 424 to a programmable carrier frequency that may be chosen from 0 to 75 MHz, which includes NTSC channels 2, 3 and 4. In order to maintain reasonable separation of the spectral images in the analog output of the digital-to-analog converter, the DAC 426 is clocked with as high a clock rate as possible.

As will be appreciated, the audio processing path depicted in FIG. 7 shows that two channels of PCM audio signals 411 are provided to the BTSC encoder 416 where they are encoded into sum and difference channels. An asynchronous capture functional block may be provided in the RFM 414 to operate at a programmable audio- range sample rate (for example, 48 kHz in one embodiment) to capture the audio input signals 411, and a variable interpolator decimator (VID) converts the signal to a desired sample rate. Alternatively, a synchronous capture function block and VID may be provided in the RFM 414 to convert the sampling rate of the audio input signals 411. The BTSC encoder 416 operates at a predetermined sample rate and provides an encoded audio output to a VID rate converter 418 that changes the sample rate (e.g., to 27 MHz) and then frequency modulates the signal.

With the present invention, other types of audio input signals could be provided to the audio processor 416, 418 for capture, rate conversion and FM modulation. For example, a BTSC multiplex audio signal may be scaled, captured by an asynchronous FIFO operating at 316 kHz, asynchronously rate converted from 316 kHz to 27 MHz, and then multiplexed or directly input to an FM modulator circuit prior to output to the A/V processor.

In accordance with the present invention, the digital video processor 420 receives as a video input a digital video composite signal 434 that contains the full NTSC, PAL, or SECAM encoded signal. In a selected embodiment, a selectable or programmable audio trap filter is provided in the form of a lowpass filter to reduce video signal content at the audio carrier frequencies. In addition, a programmable group delay digital filter may be provided to compensate the decimated output signal for the specific group delay requirements.

As depicted in FIG. 7, the digital audio/video processor portion of the RFM 414 includes a summer 422, rate converter/mixer 424 and DAC 426. Rate converter/mixer 424 may be implemented with an upsample block and modulator that receives the combined video and audio input signal from summer 422 and interpolates that signal by a factor of 4, from 27 MHz to 108 MHz. In addition, rate converter/mixer 424 may change the data sample rate from 108 MHz to 405 MHz, for example. In the rate converter/mixer 424, the output of a sine generator operating at 405 MHz (not shown) is mixed or combined with the output from the rate converter and provided to an x/sin(x) digital filter (not shown) before being converted to analog form by DAC 426. Thus, the signal provided to the DAC 426 is filtered to compensate for Sin X/X distortion inherent in the digital to analog conversion process. The output 427 of the DAC 426 may then be provided off chip. Though not illustrated in FIG. 7, an analog PLL (Phase Locked Loop) circuit clocked with a reference signal (e.g., 27 MHz or 54 MHz) provides an output signal of 405 MHz to the DAC 426.

As shown in FIG. 7, the final stage of the RFM 414 is the digital-to-analog converter 426. DAC 426 is clocked at very high speeds (up to 405 MHz) to move spectral images as far apart as possible. In order to prevent analog performance degradation, DAC 426 is clocked by a very low-jitter clock that is provided by an analog phase locked loop (PLL) illustrated in FIG. 8.

As illustrated in FIG. 8, which shows a portion of the high speed RFM clock generator, PLL 802 is sourced by a 54 MHz differential clock 801 provided by an overtone oscillator (not shown). (Persons skilled in the art will recognize that only selected output buffering stage elements of the PLL are depicted in FIG. 8, and that the PLL can be implemented as a digital PLL or analog PLL circuit.) The PLL 802 outputs a clock signal 803 (aclko) that is used to clock the RFM DAC 426, but also outputs another clock signal 804 (dclko) that is used to derive other clocks used internally within the RFM 414. FIG. 8 shows an example circuitry for high speed clock generation. As depicted, PLL 802 provides the capability to select the phase of the aclko clock signal 803 such that it balances with clock 2. This allows a straightforward handoff from the digital logic in the RFM 414 to the DAC 426.

In particular, the high speed DAC interface requires careful clock balancing. As described herein, DAC 426 requires a jitter-free clock in order to prevent analog performance degradation. Thus, the analog clock output 803 (aclko) from PLL 802 is routed directly to DAC 426 and does not traverse any digital cells. However, the digital clock output 804 (dclko) of the PLL 802 traverses digital delay elements, such as a clock tree 806. Accordingly, a timing skew is introduced between the clocks that drive the RFM's digital section and the clock that drives DAC 426. In a selected embodiment, the clock skew is reduced with a programmable delay line in PLL 802. As illustrated in FIG. 8, the inserted delay is a series of inverter or delay elements 805 that are controlled through the phase control signal 807. The aclko and dclko propagation delays through the PLL 802 are characterized so that the handoff from the RFM output registers to the DAC can be analyzed prior to tapeout using standard static timing methodologies.

Benefits of the clocking scheme depicted in FIG. 8 are flexibility, portability, and good control over clock skews. However, the PLL's output clocks (aclko and dclko) that are used by the RFM 414 are inherently asynchronous relative to the output clocks from the chip's system PLL. In order to alleviate the burden on other blocks, asynchronous FIFO interfaces may be provided in the RFM 414 that allow it to communicate synchronously with all other blocks on the chip using a system clock that is derived from the chip's system PLL. Because the PLL 802 and the system PLL are both driven by the same crystal, they should be frequency locked.

In an alternative embodiment, the clocking of the digital logic of the RF modulator may be implemented using the clock synchronization loop described in connection with co-pending U.S. patent application Ser. No. 10/372,427, entitled "All Digital Radio Frequency Modulator," filed Feb. 21, 2003, and assigned to Broadcom Corporation, which is hereby incorporated by reference in its entirety. In connection with the synchronization loop illustrated in FIG. 9 of this incorporated application, synchronous and asynchronous clocking modes are provided. In this context, synchronous clocking implies a frequency lock (or known frequency relationship) between the chip's system PLL and the RFM PLL, and asynchronous clocking implies there is no frequency lock (or no known frequency relationship) between the PLLs. The synchronization loop handles the disparity in the asynchronous clocking mode.

Referring back to FIG. 3, because analog and digital circuits fundamentally have different noise characteristics, the low frequency stereo separation for a digital encoder and an analog decoder can be substantially improved by adjusting the spectral gain 321, which is the control signal that is input to the spectral compressor's coefficient calculator 322. These adjustments are designed to account for the increased noise that is typically found in an analog system relative to a digital system, and can substantially improve the low frequency stereo separation for a digital encoder and an analog decoder. As will be appreciated, the adjustments to the control signal can be performed by spectral compressor's coefficient calculator 322, or can be implemented by other adjustment circuitry in the feedback path connected to the input of the spectral compressor 308 or calculator 321. These adjustments are designed to account for differing amounts of noise energy found in an analog system relative to a digital system. The SP GAIN 321 (as well as the WB GAIN 341) is the exponentially time-weighted root-mean-square value of the signal energy found in a particular band of audio frequencies. In the lower frequency band (i.e., below 2 kHz), the signal energy is comparable to the noise energy. As a result, the contributions by the noise energy to SP GAIN 321, when compared with the signal energy, are significant. Therefore, any difference in the noise characteristics between an encoder and a decoder can result in differing values for the computed SP GAIN 321. This mismatch leads to degraded stereo separation.

In accordance with the present invention, stereo separation at low frequencies can be improved by selectively adjusting the SP GAIN signal 321, using a variety of techniques such as described herein. In one embodiment, a clamp or saturator is used in the wideband or spectral gain feedback path to prevent the gain control signal from going below a minimum value. In another embodiment, a minor or adjustable offset is added to the spectral gain only if the spectral gain is below a certain threshold or comparison point. With this offset, stereo separation is improved for most frequencies. However, minor stereo separation jitter appears at the frequencies where the spectral gain oscillates about the maximum comparison point. Such jitter can be in terms of minor amplitude and phase variation for a single frequency. An alternative embodiment of the present invention helps control the jitter in the separation by rolling off or tapering the offset value when the spectral gain is above a maximum comparison point. Tapering the offset addresses the situation where the comparator is injecting a value of spectral gain that is noisy and that fluctuates about a comparison point for a single tone going through the compressor. Techniques for adjusting the spectral gain (SP GAIN 321) and/or the wideband gain signal (WB GAIN 341) can be implemented as described in the co-pending U.S. patent application entitled "Mechanism For Using Clamping And Offset Techniques To Adjust The Spectral And Wideband Gains In The Feedback Loops Of A BTSC Encoder," having application Ser. No. 10/784,690 and filing date of Feb. 23, 2004; now U.S. Pat. 7,277,860, and assigned to Broadcom Corporation, which is hereby incorporated by reference in its entirety to provide detailed information about the control signal adjustment techniques.

The datapath outputs from RFM 414 are the differential outputs from DAC 426. These analog signals contain the RFM A/V composite signals that are routed to the chip pins. The audio/video composite signal is typically modulated to NTSC Channel 3 (61.25 MHz) or NTSC Channel 4 (67.25 MHz). In order to maintain reasonable separation between the DAC images, DAC 426 is clocked with as high a clock rate as possible.

As will be appreciated, a selected embodiment of the present invention provides for proper digital processing of the signals by utilizing a BTSC encoder that operates at a minimum rate of about ten times the signal bandwidth, e.g., 150-200 kHz. Lower or higher sampling rates can be used, provided that good matching is achieved between the analog and digital filter performance requirements. In particular, the choice of the sampling rate is driven by the need for the digital filter implementations to more closely match the analog filter transform functions (specified by the BTSC standard) in both magnitude and phase. By implementing a BTSC encoder with a programmable sampling rate, lower sampling rates can be used in applications where lower performance is acceptable.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip set-top box integrated circuit, comprising:

a digital BTSC encoder that is operable to encode first and second digital audio signals into a BTSC encoded signal, the first and second digital audio signals having a bandwidth defined by the frequency content of the first and second digital signals;

a digital output modulator for receiving the BTSC encoded signal and generating a radio frequency (RF) modulated output signal that is provided off chip; and a BTSC decoder to receive a demodulated audio signal and to decode the demodulated audio signal for coupling to the digital BTSC encoder;

wherein the digital BTSC encoder, BTSC decoder and digital output modulator are integrated on a same common substrate and constructed as a single complementary metal oxide semiconductor (CMOS) integrated circuit chip and wherein data is exchanged between the digital BTSC encoder and the BTSC decoder in a digital loopback mode to co-verify the data.

2. The single chip set-top box integrated circuit of claim 1, wherein:

the digital BTSC encoder comprises (a) a sum channel processor comprising a first digital filter for digitally processing a digital sum signal and (b) a difference channel processor comprising a second digital filter for digitally processing a digital difference signal, wherein the digital BTSC encoder operates at a sample rate that is at least substantially ten times the bandwidth of the first and second digital audio signals so that the digital filters in the sum channel processor and the difference channel processor substantially match BTSC analog filter transform functions in both magnitude and phase; and the digital output modulator comprises an audio/video processor that is operable to encode an audio/video signal to generate the RF modulated output signal.

3. The single chip set-top box integrated circuit of claim 2, wherein the RF modulated output signal is a channel 3/4 RF modulated audio/video signal that is provided off chip.

4. The single chip set-top box integrated circuit of claim 2, further comprising:

a rate converter and FM modulator, coupled to the audio/video processor, that modulates the BTSC encoded signal to generate a processed audio signal; and a video processor, coupled to the audio/video processor, that performs video processing of a composite video signal to generate a processed video signal;

wherein the audio/video processor combines the processed audio signal and the processed video signal.

5. The single chip set-top box integrated circuit of claim 1, wherein the first and second digital audio signals are Pulse Code Modulation (PCM) baseband audio source signals.

6. The single chip set-top box integrated circuit of claim 2, wherein the digital output modulator includes a Digital to Analog Converter (DAC).

7. The single chip set-top box integrated circuit of claim 6, further including a clock generator for generating a first clock signal for clocking the DAC and for generating a second clock signal for clocking digital logic that transfers data to the DAC.

8. The single chip set-top box integrated circuit of claim 7, wherein the first and second clock signals have a phase relationship that is controlled by a phase control signal.

9. An integrated circuit that includes a digital audio/video system, the integrated circuit comprising:

a digital audio processor for BTSC encoding first and second digital audio signals into an encoded audio signal, the digital audio processor including sum channel processing means and difference channel processing means;

a digital video processor that processes a composite video signal to generate a digital video signal;

an audio/video processor coupled to modulate the encoded audio signal and digital video signal to generate a Radio Frequency (RF) modulated audio/video signal that is provided off chip; and a BTSC decoder to receive a demodulated audio signal and to decode the demodulated audio signal for coupling to the digital audio processor;

wherein the digital audio processor, digital video processor, audio/video processor, and BTSC decoder are integrated on a same common substrate and constructed as a single complementary metal oxide semiconductor (CMOS) integrated circuit chip and wherein data is exchanged between the digital BTSC encoder and the BTSC decoder in a digital loopback mode to co-verify the data.

10. The integrated circuit of claim 9, wherein the digital audio processor operates at a sample rate so that sum channel processing means and the difference channel processing means substantially match BTSC analog filter transform functions in both amplitude and phase substantially requiring no phase.

11. The integrated circuit of claim 9, wherein:

the digital audio processor is coupled to the audio/video processor and performs audio processing on a Pulse Code Modulation (PCM) baseband audio source signal to generate the encoded audio signal;

the digital video processor is coupled to the audio/video processor to generate the digital video signal; and the audio/video processor combines the encoded audio signal and the digital video signal into the audio/video signal.

12. The integrated circuit of claim 9, wherein the audio/video processor includes a Digital to Analog Converter (DAC) that is clocked with a first clock signal.

13. The integrated circuit of claim 12, further comprising a clock generator for generating the first clock signal and for providing a second clock signal to digital logic circuitry that transfers data to the DAC, wherein a timing relationship between the first clock signal and the second clock signal is programmably controlled.

14. The integrated circuit of claim 9, wherein the integrated circuit is integrated as part of a single chip set-top box.

15. The integrated circuit of claim 9, wherein the digital audio processor operates at a sample rate that is at least approximately ten times a bandwidth of the first and second digital audio signals so that no phase compensation is required in the sum channel processing means or difference channel processing means to substantially match BTSC analog filter transform functions in both magnitude and phase.

16. A method for modulating an audio/visual signal on a single integrated circuit chip, comprising:

receiving audio data and video data on the chip;

digitally processing the video data on the chip to generate a composite video signal;

digitally encoding the audio data on the chip using a BTSC encoder in accordance with a BTSC audio encoding standard to generate an encoded audio signal;

converting the encoded audio signal from a first sampling rate to a second sampling rate on the chip;

frequency modulating an aural carrier using the converted encoded audio signal on the chip, thereby generating a frequency modulated (FM) audio signal;

mixing the composite video signal and FM audio signal to a programmable carrier frequency on the chip, in which encoding, converting and mixing are performed in a single complementary metal oxide semiconductor (CMOS) integrated circuit chip to generate an RF modulated audio/visual signal;

outputting the RF modulated audio/visual signal off chip;

receiving an audio signal at a BTSC decoder also located in the CMOS integrated circuit chip to decode a demodulated audio signal for coupling to the BTSC encoder; and exchanging data between the BTSC encoder and the BTSC decoder in a digital loopback mode to co-verify the data.

17. The method of claim 16, wherein the RF modulated audio/visual signal is a channel 3/4 RF modulated audio/video signal.

18. The method of claim 16, wherein when digitally encoding the audio data, the encoding is performed using a sampling rate of at least approximately 150-200 kHz to generate the encoded audio signal.

* * * * *